US011320012B2

(12) United States Patent
Redemann et al.

(10) Patent No.: US 11,320,012 B2
(45) Date of Patent: May 3, 2022

(54) DISC BRAKE FOR UTILITY VEHICLES

(71) Applicant: WABCO EUROPE BVBA, Brussels (BE)

(72) Inventors: Bernward Redemann, Hockenheim (DE); Marcel Kalmbach, Weinheim (DE)

(73) Assignee: WABCO Europe BVBA, Brussels (BE)

( * ) Notice: Subject to any disclaimer, the term of this patent is extended or adjusted under 35 U.S.C. 154(b) by 49 days.

(21) Appl. No.: 16/961,372

(22) PCT Filed: Dec. 19, 2018

(86) PCT No.: PCT/EP2018/085764
§ 371 (c)(1),
(2) Date: Jul. 10, 2020

(87) PCT Pub. No.: WO2019/137768
PCT Pub. Date: Jul. 18, 2019

(65) Prior Publication Data
US 2020/0347898 A1 Nov. 5, 2020

(30) Foreign Application Priority Data

Jan. 10, 2018 (EP) .................................. 18151103.1

(51) Int. Cl.
*F16D 55/02* (2006.01)
*F16D 65/56* (2006.01)
(Continued)

(52) U.S. Cl.
CPC ......... *F16D 65/567* (2013.01); *F16D 55/225* (2013.01); *F16D 65/0025* (2013.01); *F16D 2250/0076* (2013.01)

(58) Field of Classification Search
CPC .......... F16D 65/18; F16D 65/40; F16D 65/56; F16D 65/567; F16D 55/02
(Continued)

(56) References Cited

U.S. PATENT DOCUMENTS

| 2009/0236189 A1* | 9/2009 | Macke ...................... F16J 15/52 |
| | | 188/73.43 |
| 2012/0325595 A1* | 12/2012 | Malki ...................... B21K 7/14 |
| | | 188/71.7 |
| 2016/0186827 A1* | 6/2016 | Jungmann ............. F16D 65/567 |
| | | 188/71.9 |

FOREIGN PATENT DOCUMENTS

| DE | 102007059777 A1 | 6/2009 |
| DE | 102011011394 A1 | 8/2012 |

(Continued)

*Primary Examiner* — Christopher P Schwartz
(74) *Attorney, Agent, or Firm* — Dickinson Wright PLLC

(57) ABSTRACT

The invention relates to a disc brake (1) for utility vehicles, having a brake caliper, a brake disc (37), an actuating lever (4) arranged axially to a disc brake axis (A) of the brake disc (37), an adjusting device (36) comprising an adjusting spindle (12), a pressure collar (13) and an adjusting spindle head (27), wherein the adjusting device (36) is arranged at least partially within an interior (7) of the brake caliper (2), a primary seal (8) for sealing the interior (7) of the brake caliper (2), an annular space (10), which is delimited by an inner wall (6) of a through-opening (19) of the brake caliper (2) and the adjusting device, and a secondary seal (9) for at least partially sealing the interior (7) of the brake caliper (2), characterized in that the primary seal (8) and the secondary seal (9) are designed as a piston protection cap (14).

19 Claims, 7 Drawing Sheets

(51) Int. Cl.
*F16D 55/225* (2006.01)
*F16D 65/00* (2006.01)

(58) Field of Classification Search
USPC .................... 188/71.7, 71.8, 71.9, 72.7–72.9
See application file for complete search history.

(56) References Cited

FOREIGN PATENT DOCUMENTS

| DE | 102012006114 A1 | 9/2013 |
| DE | 102013006859 A1 | 10/2014 |
| EP | 2444698 A1 | 4/2012 |
| WO | 9949242 A1 | 9/1999 |

* cited by examiner

DISC BRAKE FOR UTILITY VEHICLES

TECHNICAL FIELD

The present disclosure relates to a disc brake.

BACKGROUND

Disc brakes having a primary seal and a secondary seal in the region of an adjusting spindle are well known. The primary seal and the secondary seal protect the inner region of a brake caliper from environmental influences such as snow, rain, dust or stones. In particular, the aim is to maintain the functionality of the components of the disc brake for closing brake pads. For example, protection from environmental influences is necessary for an adjusting device. Amongst other things, the adjusting device comprises an adjusting spindle arranged axially in the direction of the disc brake axis for adjusting the brake pads with respect to the brake disc. If the functionality of the adjusting spindle is restricted or the adjusting spindle is damaged due to corrosion, the disc brake can no longer compensate for the wear on the brake pads and keep the air gap constant. The air gap becomes gradually larger and the result is consequently a loss of brake force and brake torque.

Three seals for protecting the interior of the brake caliper of the disc brake are known from WO99/49242 A1. A primary seal is arranged on an adjusting spindle head of the adjusting spindle and the cover plate. A secondary seal abuts against the adjusting spindle and is connected to the pressure collar via a metal part. A third seal is arranged between a metal part of the primary seal and the metal part of the secondary seal.

Further optimization of the sealing of the interior against environmental influences is revealed in DE102011011394 A1. One seal is a gaiter constructed as a primary seal and a second seal is a secondary seal arranged concentrically to the gaiter. The primary seal is connected via a metal part to a plastic part which has a secondary seal designed as a sealing lip. The primary seal and the secondary seal are connected to the cover plate via the plastic part.

DE102012006114 A1 describes a further improvement to the sealing by means of a primary seal and a secondary seal in the region of the adjusting spindle of the adjusting device. The secondary seal has a threaded sealing ring, which rotates with the adjusting spindle of the adjusting device. Moreover, the secondary seal has a non-rotating sealing membrane. Both the primary seal and the secondary seal have to be mounted individually on the cover plate.

A further option for sealing the brake caliper interior is disclosed in DE102007059777 A1. To improve assembly and dismantling, a holding device is provided, which holds a secondary seal and against which a third seal abuts. The holding device is supported on the pressure collar. A primary seal is connected to the piston of the adjusting spindle and the cover plate. In the event of a leaky primary seal, the secondary seal and the third seal protect the interior of the brake caliper from environmental influences.

SUMMARY

An object of the present disclosure is to further develop DE102007059777 A1 in such a way that the interior of the brake caliper with the components arranged within the brake caliper is protected from environmental influences, and the assembly or disassembly of the primary seal and the secondary seal is improved. It is furthermore an object of the invention to simplify the production of the cover plate.

The object is achieved in that a primary seal and a secondary seal are designed as a piston protection cap. This means that the primary seal and the secondary seal are not independent components which are assembled to form the piston protection cap. Instead, the piston protection cap is a component that includes the primary seal and the secondary seal. The primary seal and the secondary seal are preferably made from an elastic material.

In a further aspect, the secondary seal is arranged within an annular space of a brake caliper of a disc brake and therefore fulfills the sealing function if the primary seal becomes damaged. The secondary seal is in contact with the adjusting spindle at one end. With the end which is in contact with the adjusting spindle, the secondary seal, during an axial rotating movement of the adjusting spindle, slides in the direction of the brake disc or opposite to the brake disc via the adjusting spindle.

Moreover, in a further aspect, the primary seal with a sealing diameter "D" is arranged on an adjusting spindle head of the adjusting spindle and the secondary seal is arranged with a sealing diameter "D2" on an adjusting spindle neck of the adjusting spindle. The sealing diameter "D" of the primary seal can be larger or smaller than the sealing diameter "D2" of the secondary seal. However, it is also conceivable that the sealing diameter "D" of the primary seal and the sealing diameter "D2" of the secondary seal are the same size.

In a further aspect, the piston protection cap is arranged on a cover plate of the brake caliper via a holding device. The protection cap is particularly advantageously arranged on the cover plate of the brake caliper with force fit via the holding device. The holding device is preferably a metal profile, which has an L-shape in cross-section. The holding device can also be made from plastic or other materials.

In a further aspect, the protection cap has an undercut radially in the direction of the cover plate of the brake caliper. A radial direction is understood to refer to a direction extending transversely to the disc brake axis. The undercut serves as an additional securing device and to increase the withdrawal forces of the primary seal. Withdrawal force refers to the disassembling forces which are required to remove the protection cap from the cover.

At least one nub forms the undercut of the protection cap in a further advantageous aspect. The at least one nub is preferably made from the same material as the primary seal and the secondary seal.

An opening of the cover plate of the brake caliper and/or the groove of the adjusting spindle head and/or the adjusting spindle neck is designed as a circular profile, as an oval profile or as a polygonal profile in a further configuration. The primary seal and the secondary seal are preferably drawn from a circular profile.

Moreover, the protection cap is arranged directly on the cover plate of the brake caliper in a further advantageous aspect. The holding device is no longer needed, thereby reducing assembly steps and lowering costs.

Without the holding device, the protection cap is fastened in a circumferential groove of the cover plate in a further configuration. The circumferential groove of the cover plate has a V shape or a U shape. The necessary pre-tension on an annular bead of a common end of the primary seal and the secondary seal of the protection cap is achieved by changing the diameter of the annular bead.

In a further aspect, the protection cap is fastened to the cover plate by vulcanization. Vulcanization is understood to refer to thermoplastic shaping. A material-fitting connection between the protection cap and the cover plate is produced by the vulcanization.

In a further aspect, the protection cap can be disassembled and the piston protection cap can be changed. For example, a damaged protection cap can be replaced with a new protection cap during servicing.

Moreover, in relation to the disc brake axis, the primary seal is arranged radially on the adjusting spindle head of the adjusting spindle in a further aspect. The primary seal is movable in the direction of the disc brake axis.

Moreover, the secondary seal is designed to be L-shaped in cross-section in a further aspect.

The primary seal is a gaiter in a further aspect. During an axial movement of the adjusting spindle in the direction of the brake disc, the gaiter unfolds and folds together in a direction opposite to the brake disc. The adjusting spindle therefore remains entirely protected against environmental influences.

From a manufacturing standpoint, the cover plate can be advantageously produced from a bending direction in a further aspect. The bending direction is understood to refer to the direction from which the cover plate is machined using the machining tool. The cover plate no longer needs to be turned during the machining procedure. In particular, the form of the cover plate is produced by a cutting die and a punch. A second assembly step from a second bending direction is not required.

BRIEF DESCRIPTION OF THE DRAWINGS

Selected exemplary aspects of the invention are explained below with the aid of the accompanying figures, in which.

DETAILED DESCRIPTION OF THE DRAWINGS

Figure 1:
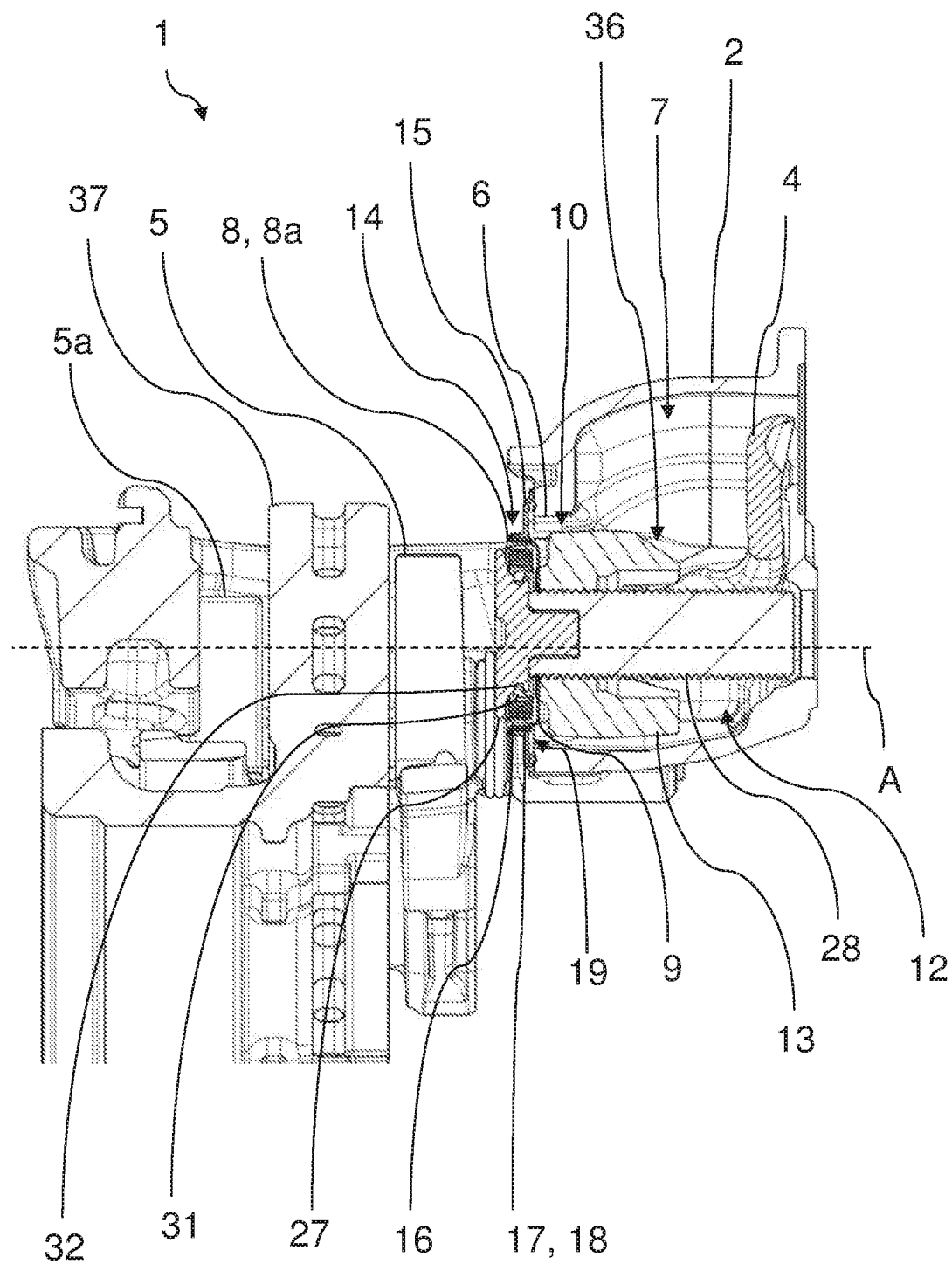
FIG. 1 illustrates a sectional view of a disc brake with a protection cap.

FIG. 1 shows a sectional side view of a disc brake 1 with a brake caliper 2 and a brake disc 37 arranged between two brake pads 5, 5a. An actuating lever 4 is moved axially in the direction of the brake disc 37 or opposite to the direction of the brake disc 37 via an actuator. As a result of the rotating movement of the actuating lever 4, an adjusting spindle 12 moves axially in the direction of the brake disc 37 until the brake pads 5, 5a abut against the brake disc 37. The brake pads 5, 5a are released from the brake disc 37 when the adjusting spindle 12 moves opposite to the direction of the brake disc 37. The adjusting spindle 12 is arranged within an interior 7 of the brake caliper 2, axially along a disc-brake axis A, and extends axially along the brake disc axis A through a pressure collar 13. The adjusting spindle 12, an adjusting spindle head 27, and the pressure collar 13 form an adjusting device 36. An annular space 10 is delimited by an inner wall 6 of a through-opening 19 of the brake caliper 2 and the adjusting device 36 extending through the through-opening 19. A cover plate 15 of the brake caliper 2, with a protection cap 14, is arranged on the brake caliper 2, in the region of the through-opening 19 of the brake caliper 2. The cover plate 15 of the brake caliper 2 has an opening 34 (FIG. 5), wherein the protection cap 14 is arranged in the opening 34. The protection cap 14 has a primary seal 8, a secondary seal 9, and a holding device 16. The primary seal 8 is designed as a gaiter 8a and has, at one end, an annular bead 31 which is secured in a groove 32 of the adjusting spindle head 27 of the adjusting spindle 12. The gaiter 8a moves with the adjusting spindle 12 in the axial direction of the disc brake axis A. The secondary seal 9 abuts against an adjusting spindle neck 28 of the adjusting spindle 12. The protection cap 14 additionally has an undercut 18 designed as a nub 17.

Figure 2:
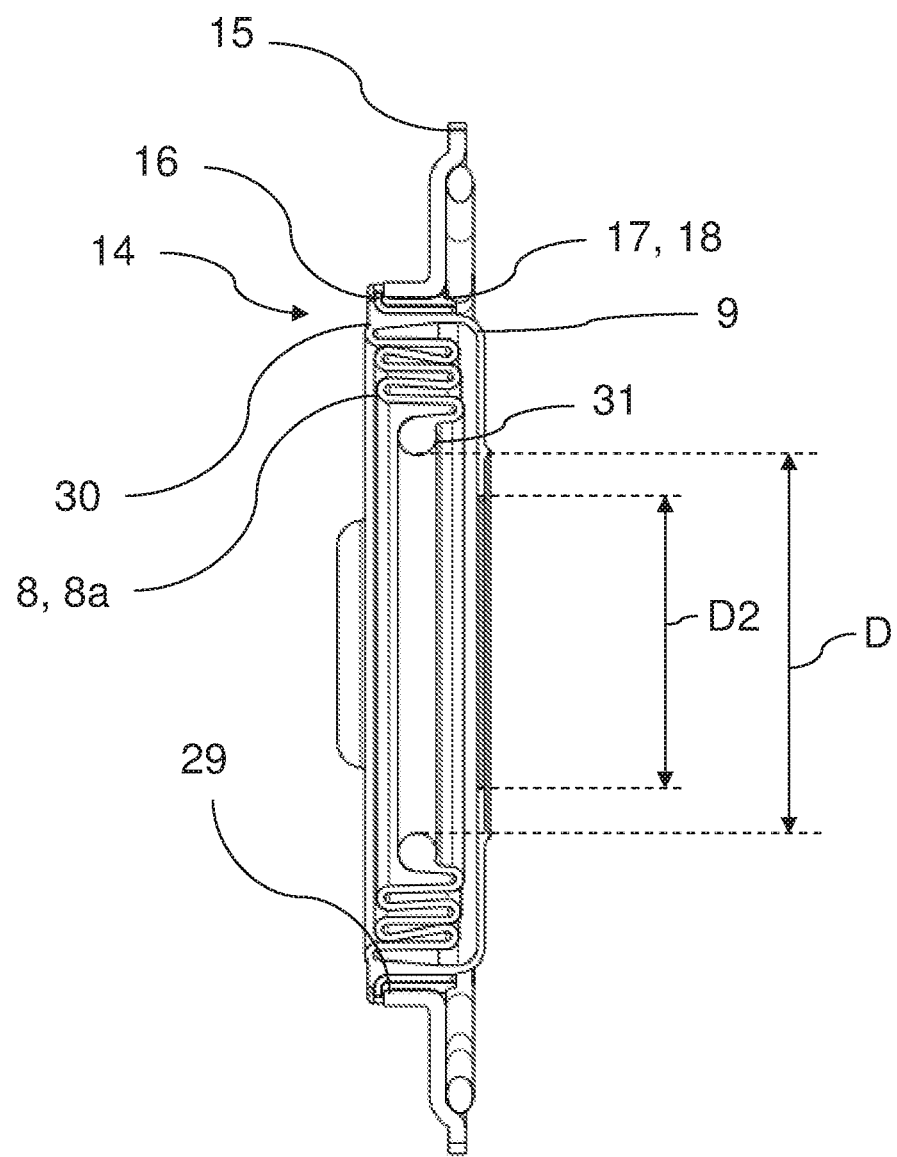
FIG. 2 illustrates a cross-section of the protection cap with a holding device in detail.

The protection cap 14 with the holding device 16 according to FIG. 1 is shown in detail in FIG. 2. The arrangement of the piston protection cap 14 on the cover plate 15 of the brake caliper 2 (FIG. 1) is shown particularly clearly. The holding device 16 is designed as a metal ring and is fastened in the piston protection cap 14 at a common end 30 of the primary seal 8 and the secondary seal 9. The holding device 16 serves to shape and stabilize the piston protection cap 14. Via the clamping force of the holding device 16, the piston protection cap 14 is pushed against an inner wall 29 of the cover plate 15 of the brake caliper 2 by the holding device 16. The connection of the piston protection cap 14 to the cover plate 15 is achieved by pressing. The piston protection cap 14 is therefore connected to the cover plate 15 of the brake caliper 2 with force fit. The undercut 18 designed as a nub 17 is arranged on the piston protection cap 14 as an additional securing device to prevent the piston protection cap 14 coming loose from the cover plate 15. Moreover, the annular bead 31 of the primary seal 8 is clearly visible. The primary seal 8 has, in the disassembled state, a larger sealing diameter D than the sealing diameter D2 of the secondary seal 9 in the disassembled state.

Figure 2A:
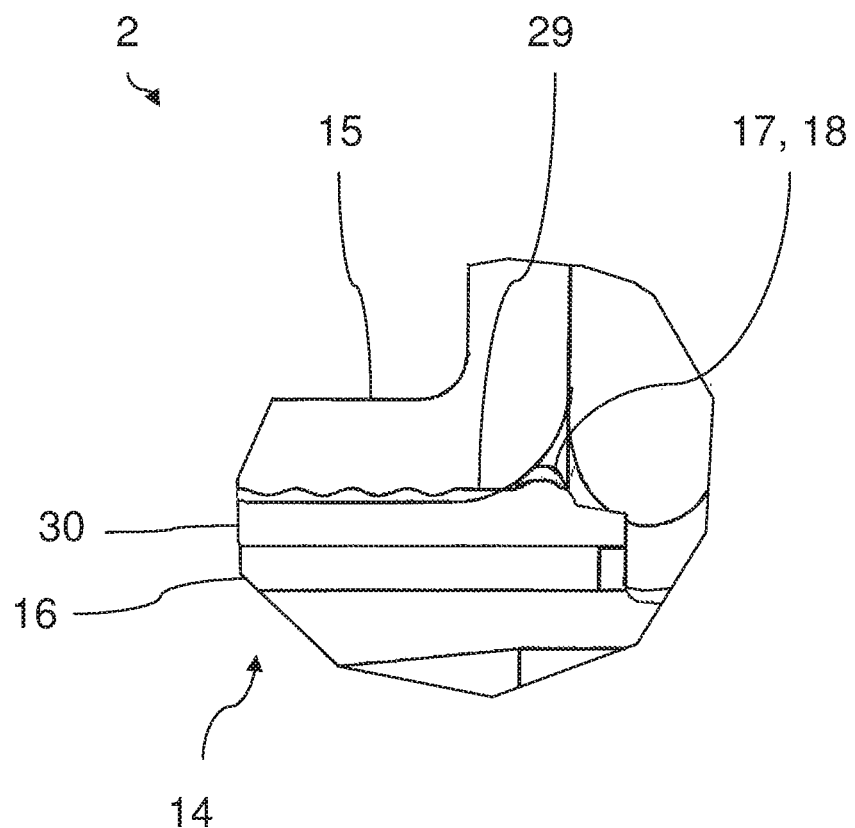
FIG. 2a illustrates a detailed view of the undercut of a protection cap according to FIG. 1 and FIG. 2.

A detailed section of the undercut 18 designed as a nub 17 according to FIG. 1 and FIG. 2 is shown in FIG. 2a. The nub 17 acts as a barb to prevent the piston protection cap 14 from slipping. The nub 17 is supported on the cover plate 15 of the brake caliper 2. The common end 30 of the primary seal 8 and the secondary seal 9 has, in the region of the inner wall 29 of the cover plate 15, a corrugated structure which minimizes a shifting of the piston protection cap 14 from the cover plate 15 of the brake caliper 2.

Figure 3:
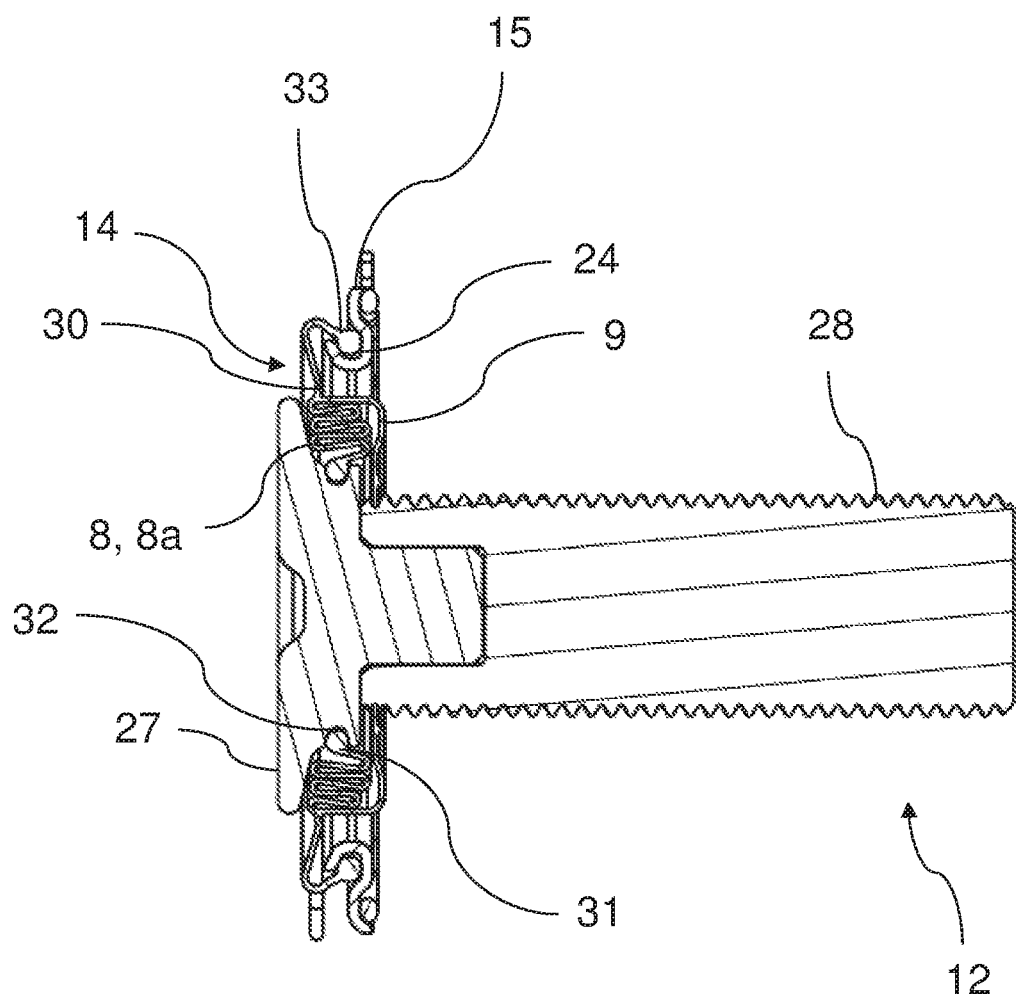
FIG. 3 illustrates a sectional side view of an adjusting spindle with a piston protection cap without a holding device in the installed state.

FIG. 3 shows the piston protection cap 14 for a disc brake 1 according to FIG. 1 without a holding device 16. The protection cap 14 has a primary seal 8 designed as a gaiter 8a and a secondary seal 9. The protection cap 14 additionally has an annular bead 33 on a common end 30 of the primary seal 8 and the secondary seal 9, and an annular bead 31 on the primary seal 8. The annular bead 31 of the primary seal 8 is fastened in a groove 32 of the adjusting spindle head 27. The secondary seal 9 abuts against an adjusting spindle neck 28 of the adjusting spindle 12. The annular bead 33 of the common end 30 of the primary seal 8 and the secondary seal 9 is attached in a circumferential groove 24 of the cover plate 15. The circumferential groove 24 of the cover plate 15 is designed as a V-shaped groove.

Figure 4:
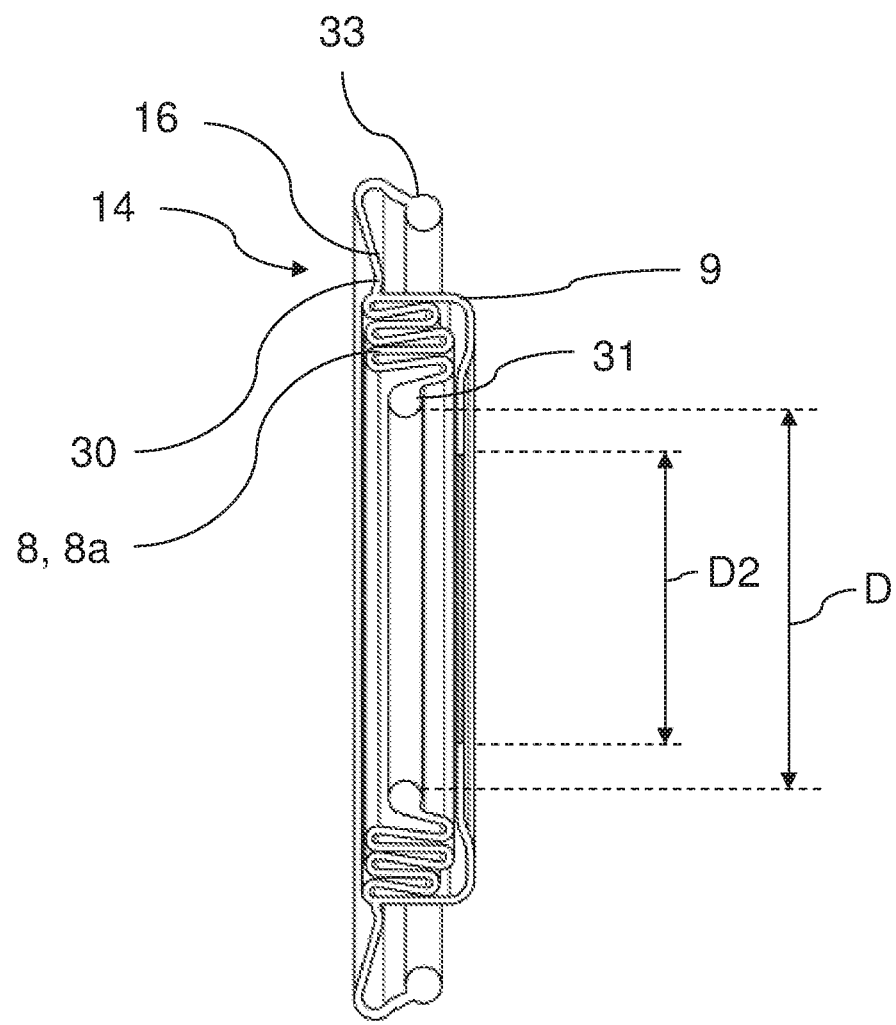
FIG. 4 illustrates a cross-section of the protection cap without a holding device.

In FIG. 4, the piston protection cap 14 according to FIG. 3 is shown entirely in cross-section. In particular, the alignment of the annular bead 33 of the common end 30 of the primary seal 8 and the secondary seal 9 can be seen.

Moreover, FIG. 4 shows that the sealing diameter D of the primary seal 8 is larger than the sealing diameter D2 of the secondary seal.

Figure 5:
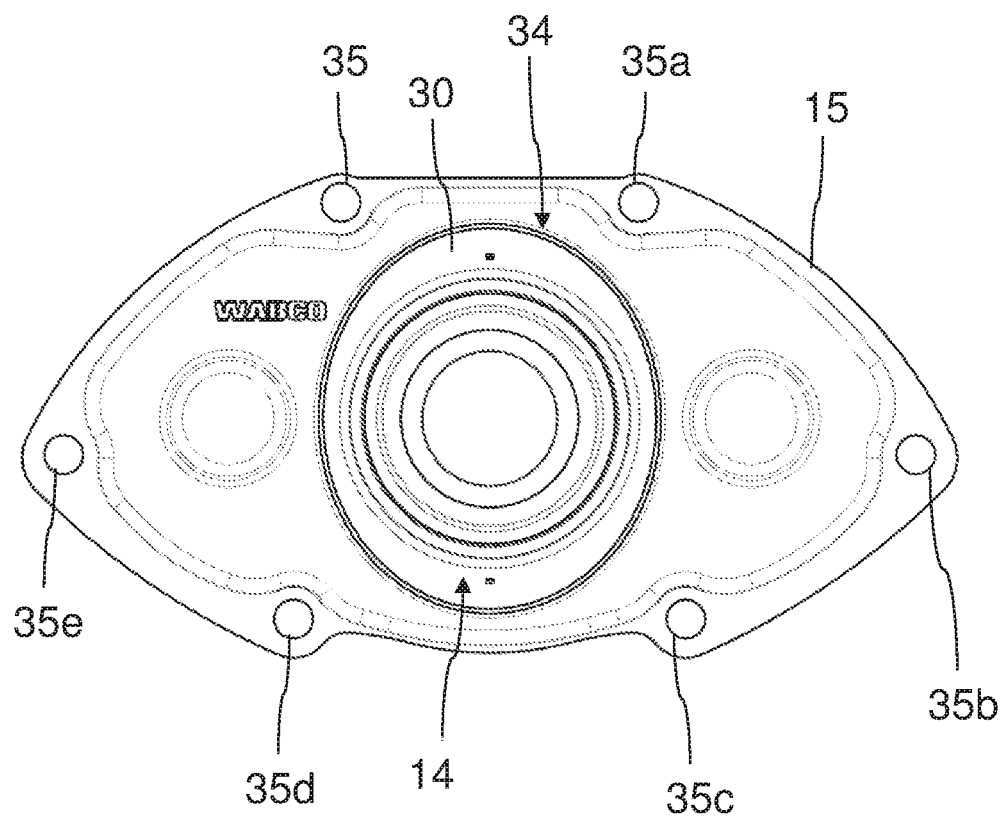
FIG. 5 illustrates a cover plate for receiving a protection cap with an oval profile.

FIG. 5 shows a cover plate 15 of the brake caliper 2 with an opening 34 for receiving a protection cap 14 for a disc brake 1 according to FIG. 1. The opening 34 of the cover plate 15 of the brake caliper 2 has an oval profile. To fasten the cover plate 15 of the brake caliper 2, six boreholes 35, 35a, 35b, 35c, 35d, 35e are arranged on the brake caliper 2, along the cover plate 15 of the brake caliper 2. The cover plate 15 of the brake caliper 2 closes the through-opening 19 of the brake caliper 2 (FIG. 1). The common end 30 of the piston protection cap 14 is designed as an oval profile. The protection cap 14 is arranged in the opening 34 of the cover plate 15 of the brake caliper 2.

Figure 6:
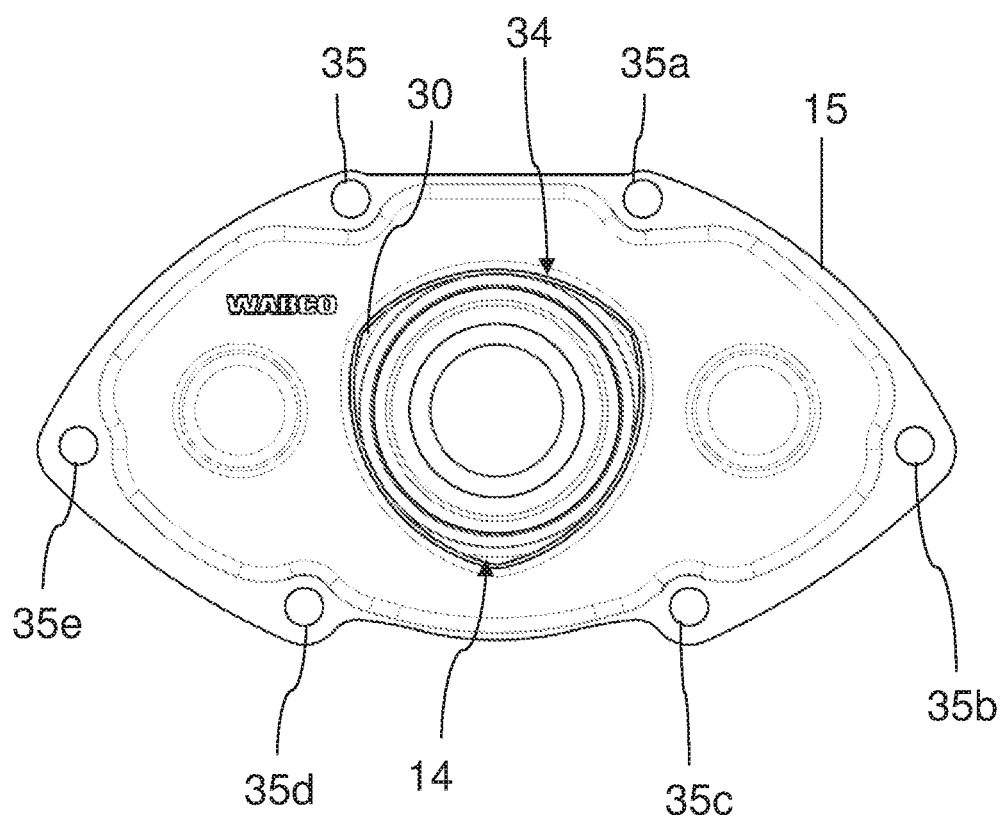
FIG. 6 illustrates a cover plate for receiving a protection cap with a polygonal profile.

FIG. 6 shows a cover plate 15 of the brake caliper 2 according to FIG. 5 for a disc brake according to FIG. 1. In FIG. 6, the cover plate 15 of the brake caliper 2 has an opening 34 with a polygonal profile. The common end 30 of the piston protection cap 14 is also designed as a polygonal profile to fasten the piston protection cap 14 in the opening 34 of the cover plate 15 of the brake caliper 2.

While the above description constitutes the preferred embodiments of the present invention, it will be appreciated that the invention is susceptible to modification, variation and change without departing from the proper scope and fair meaning of the accompanying claims.

The invention claimed is:

1. A disc brake (1) for utility vehicles, comprising:
   a brake caliper (2),
   a brake disc (37),
   an actuating lever (4) arranged axially to a disc brake axis (A) of the brake disc (37),
   an adjusting device (36) comprising an adjusting spindle (12), a pressure collar (13) and an adjusting spindle head (27), wherein the adjusting device (36) is arranged at least partially within an interior (7) of the brake caliper (2),
   a primary seal (8) configured to seal the interior (7) of the brake caliper (2),
   an annular space (10), which is delimited by an inner wall (6) of a through-opening (19) of the brake caliper (2) and the adjusting device (36), and
   a secondary seal (9) configured to at least partially seal the interior (7) of the brake caliper (2),
   wherein the primary seal (8) and the secondary seal (9) define a protection cap (14);
   wherein the protection cap (14) is disposed on a cover plate (15) of the brake caliper (2);
   wherein the protection cap (14) has a projection (18) radially in the direction of the cover plate (15) of the brake caliper (2) that secures the protection cap (14) to the cover plate (15).

2. The disc brake (1) as claimed in claim 1, wherein the protection cap (14) is disposed on the cover plate (15) of the brake caliper (2) via a holding device (16).

3. The disc brake (1) as claimed in claim 2, wherein the protection cap (14) is pushed and secured against an inner wall (29) of the cover plate (15) of the brake caliper (2) by the holding device (16), and the projection (18) is a nub (17) and provides additional securement of the protection cap (14) against removal from the cover plate (15).

4. The disc brake (1) as claimed in claim 3, wherein the protection cap (14) includes a common end (30) from which the primary seal (8, 8a) and secondary seal (9) extend radially inward, wherein the common end (30) is disposed radially within an inner wall of an opening (34) of the cover plate (15).

5. The disc brake (1) of claim 4, wherein the protection cap (14) has a projection (18) radially in the direction of the cover plate (15) of the brake caliper (2), wherein the protection cap (14) includes both the primary seal (8, 8a) and the secondary seal (9) as a one-piece structure, and the projection (18) provides captive securement against a release of the protection cap (14) from the cover plate (15).

6. The disc brake (1) as claimed in claim 2, wherein at least one nub (17) forms the projection (18) of the protection cap (14).

7. The disc brake (1) for utility vehicles as claimed in claim 2, wherein an opening (34) of the cover plate (15) defines a circular profile, an oval profile or a polygonal profile.

8. The disc brake (1) as claimed in claim 2, wherein the protection cap (14) is disposed directly on the cover plate (15) of the brake caliper (2).

9. The disc brake (1) as claimed in claim 2, wherein the protection cap (14) is fastened in a circumferential groove (24) of the cover plate (15).

10. The disc brake (1) as claimed in claim 2, wherein the protection cap (14) is fastened to the cover plate (15) by vulcanization.

11. The disc brake (1) as claimed in claim 2, wherein the cover plate (15) is produced from a single bending direction.

12. The disc brake (1) as claimed in claim 1, wherein the secondary seal (9) is arranged within the annular space (10).

13. The disc brake (1) as claimed in claim 1, wherein the primary seal (8) has a sealing diameter (D) and is disposed on the adjusting spindle head (27) and the secondary seal (9) has a sealing diameter (D2) and is disposed on an adjusting spindle neck (28) of the adjusting spindle (12).

14. The disc brake (1) as claimed in claim 1, wherein the protection cap (14) is configured to be disassembled from the disc brake (1).

15. The disc brake (1) as claimed in claim 1, wherein, in relation to the disc brake axis (A), the primary seal (8) is arranged radially on the adjusting spindle head (27) of the adjusting spindle (12) and the primary seal (8) is movable in the direction of the disc brake axis (A).

16. The disc brake (1) as claimed in claim 1, wherein the secondary seal (9) is L-shaped in cross-section.

17. The disc brake (1) as claimed in claim 1, wherein the primary seal (8) is a gaiter (8a).

18. The disc brake (1) as claimed in claim 1, wherein the protection cap (14) includes both the primary seal (8, 8a) and the secondary seal (9) as a one-piece structure, and the projection (18) provides captive securement against a release of the protection cap (14) from the cover plate (15).

19. A disc brake (1) for utility vehicles, comprising:
   a brake caliper (2),
   a brake disc (37),
   an actuating lever (4) arranged axially to a disc brake axis (A) of the brake disc (37),
   an adjusting device (36) comprising an adjusting spindle (12), a pressure collar (13) and an adjusting spindle head (27), wherein the adjusting device (36) is arranged at least partially within an interior (7) of the brake caliper (2),
   a primary seal (8) configured to seal the interior (7) of the brake caliper (2),
   an annular space (10), which is delimited by an inner wall (6) of a through-opening (19) of the brake caliper (2) and the adjusting device (36), and a secondary seal (9) configured to at least partially seal the interior (7) of the brake caliper (2),
wherein the primary seal (8) and the secondary seal (9) define a protection cap (14);
wherein the protection cap (14) is disposed on a cover plate (15) of the brake caliper (2);
wherein the protection cap (14) includes a common end (30) from which the primary seal (8, 8*a*) and secondary seal (9) extend radially inward, wherein the common end (30) is disposed radially within an inner wall of an opening (34) of the cover plate (15).

* * * * *